United States Patent [19]

Abney et al.

[11] Patent Number: 5,666,641
[45] Date of Patent: *Sep. 9, 1997

[54] PREPARATION AND USE OF POLYMERIC MATERIALS CONTAINING HYDROPHOBIC ANIONS AND PLASTICIZERS FOR SEPARATION OF CESIUM AND STRONTIUM

[76] Inventors: Kent D. Abney, 30 San Juan St.; Scott A. Kinkead, 70 Canada Cir.; Caroline F. V. Mason, 148 Piedra Loop, all of Los Alamos, N. Mex. 87544; Jiri Rais, Fr. Krizka 11, 17000 Praha 7, Czech Rep.

[*] Notice: The terminal 10 months of this patent has been disclaimed.

[21] Appl. No.: 418,712

[22] Filed: Apr. 7, 1995

[51] Int. Cl.$^6$ ............... C01F 13/00; C08K 5/06
[52] U.S. Cl. ............... 423/2; 423/157; 423/181; 588/20; 524/755; 264/216; 252/184; 210/682; 210/681
[58] Field of Search ............... 423/2, 157, 181; 588/20; 524/755; 264/216; 252/184; 210/660, 681, 682

[56] References Cited

U.S. PATENT DOCUMENTS 4,749,518   6/1988   Davis, Jr. et al. ............... 252/627

OTHER PUBLICATIONS

Steckle, American Chemical Society national meeting (208th) Washington, DC, 21–26 Aug. 1994, (notes), sponsored by D.O.E.

Hurlburt, Inorganic Chemistry, (1995), 34(21) 5215–5219, "New Synthetic Routes to B–Halugenated Derivatives of Cobalt Dicabollide".

W. P. Steckle et al., "Cobalt Dicarbollide Containing Polymer Resins for Cesium and Strontium Uptake," American Chemical Society 208th national meeting, Washington, DC, Aug. 21–26, 1994, (Notes).

R. Eugster et al., "Plasticizers for Liquid Polymeric Membranes of Ion–Selective Chemical Sensors," Anal. Chim. Acta 289, 1 (1994).

J. Krtil et al., "Extraction of Cesium Salt of Tetraphenylborate from Aqueous Solutions with Nitrobenzene," Coll. Czech. Chem. Comm. 27, 2096 (1962).

T. Sekine et al., "Extraction of Alkali Metal Tetraphenylborates," Anal. Chim. Acta 45, 133 (1969).

J. Rais, "Individual Extraction Constants in the System Water Nitrobenzene," Coll. Czech. Chem. Comm. 36, 3523 (1971).

D. A. Lee, "Solvent Extraction of Cesium and Rubidium with Triphenylcyano Boron," J. Inorg. Nucl. Chem. 34, 2895 (1972).

P. Selucky, "Selectivities of Extraction of Alkali Metal Cations into o–Nitrophenyl Octyl Ether," 1st Workshop of EC Project No. CIPA–CT93–0133 (DG 12HSMU), Rez, Czech Republic, May 5, 1994.

Primary Examiner—Charles T. Jordan
Assistant Examiner—Anthony R. Chi

[57] ABSTRACT

Preparation and use of polymeric materials containing hydrophobic anions and plasticizers for extraction of cesium and strontium. The use of polymeric materials containing plasticizers which are solvents for hydrophobic anions such as derivatives of cobalt dicarbollide or tetraphenylborate which are capable of extracting cesium and strontium ions from aqueous solutions in contact with the polymeric materials, is described. The polymeric material may also include a synergistic agent for a given ion like polyethylene glycol or a crown ether, for removal of radioactive isotopes of cesium and strontium from solutions of diverse composition and, in particular, for solutions containing large excess of sodium nitrate.

17 Claims, No Drawings

PREPARATION AND USE OF POLYMERIC MATERIALS CONTAINING HYDROPHOBIC ANIONS AND PLASTICIZERS FOR SEPARATION OF CESIUM AND STRONTIUM

The invention was made with government support under Contract No. W-7405-ENG-36 awarded by the U.S. Department of Energy to the Regents of the University of California. The government has certain rights in the invention.

FIELD OF THE INVENTION

The present invention relates generally to the separation of cesium and strontium from aqueous solution and, more particularly, to the use of polymeric materials containing certain hydrophobic anions which are soluble in plasticizers for the polymeric substrate and which attract cesium and strontium, for the separation of Cs and Sr from aqueous solution.

Background of the Invention

Separation of cesium and strontium from nuclear waste is a pressing concern for both governments and the commercial nuclear power industry. During the first 30 years after irradiation of nuclear fuels, Cs and Sr contribute 98% of the thermal energy, and 97% of the penetrating radiation in the process waste. The most important fission-produced cesium isotope is $^{137}Cs$ (fission yield=6.19%), which has a half-life of 30.17 years, and decays by both $\beta$- (514 keV) and $\gamma$- (662 keV) emission. $^{90}Sr$ (fission yield=5.8%) has a half-life of 29.1 years and decays by $\beta$- (546 keV) emission. These two elements dominate the immediate risks associated with nuclear waste, especially defense-related wastes generated from actinide separation processes. Separation of these elements is often complicated by the high concentration of sodium in the waste, amounting to a Na/Cs mole ratio of $10^5$. In order to reduce the risk to public health and prepare nuclear wastes for final disposition, selective and cost-effective separation procedures for these radionuclides must be devised. Removal of the major heat- and radiation-producing nuclides, $^{137}Cs$ and $^{90}Sr$, from high-level nuclear wastes also helps to reduce the cost of processing wastes for disposal, and to decontaminate wastes to low-level characteristics.

Proposed technologies for separation and recovery of Cs and Sr from nuclear waste streams often mention cobalt dicarbollide, $Co(C_2B_9H_{11})_2$, $[CoB_2]$. However, application of cobalt dicarbollide to waste treatment has been deterred by the perception that highly toxic nitrobenzene is required as a diluent for the process.

Since 1976, attempts have been made to use cobalt dicarbollide in alternative. solvents. The earliest report on cesium extraction using $H^+CoB_2^-$ demonstrated that dilution of the nitrobenzene solvent with basic solvents such as ethyl acetate, diisopropyl ether, or tert-butanol resulted in dramatic decreases in the quantity of cesium in the organic phase. The mechanism for this depression in extraction efficiency, known as the distribution coefficient, D, is believed to be the formation of $H^+$ solvates in the organic phase, which prevents exchange of $H^+$ ions for $Cs^+$. By contrast, no decrease in $D_{Cs}$ was observed when nitrobenzene was diluted with benzene, trichloroethylene, or dichloromethane. Later reports showed that $D_{Cs}$ and the Cs/Rb selectivity both increased upon dilution of nitrobenzene with benzene or $CCl_4$. Unfortunately, cobalt dicarbollide is insufficiently soluble to function in mixtures of >60% nonpolar solvent in nitrobenzene, and loss of this compound into the aqueous phase strongly increases with the concentration of nonpolar solvent, even for mixtures having $\leq 60\%$ of nonpolar solvent. Because of the combined problems of basicity, toxicity and solubility, successful $CoB_2^-$-based liquid separations have thus far only been achieved in expensive solvents such as nitrophenyl octyl ether and certain polyfluoroalkyl ethers. Clearly, however, interest in the use of such solvents for extractions would be enhanced if solvent losses were extremely low and the solvent could be reused.

Systems used for separation of uni- and bivalent cations (e.g., cobalt dicarbollide in nitrobenzene) often show similarities to the systems used in electrochemistry for preparation of ion-selective membranes. In electrochemistry, nitrated solvents are commonly used. For example, in a single review article, 39 out of 55 compounds investigated were nitroaromatic solvents, and o-nitrophenyl octyl ether was the most commonly used of the solvents (See e.g., R. Eugster et al., "Plasticizers for Liquid Polymeric Membranes of Ion-Selective Chemical Sensors," Anal. Chim. Acta 289, 1 (1994)). A second similarity involves the use of hydrophobic anions to enable the migration of the cation of interest into the membrane. As examples, tetraphenylborate anion, or the more stable fluoro- or chloro-substituted tetraphenylborates (e.g., tetrakis(p-chlorophenyl) borates), are commonly used in electrochemistry. Similarly, the tetraphenylborate anion has long been used as an extractant of cesium into nitrobenzene (See, e.g., J. Krtil et al., "Extraction of Cesium Salt of Tetraphenylborate from Aqueous Solutions with Nitrobenzene," Coil. Czech. Chem. Comm. 27, 2096 (1962); T. Sekine et al., "Extraction of Alkali Metal Tetraphenylborates," Anal. Chim. Acta 45, 133 (1969); J. Rais, "Individual Extraction Constants in the System Water Nitrobenzene," Coil. Czech. Chem. Comm. 36, 3523 (1971) ), as have other tetraphenylborate derivatives (See, e.g., D. A. Lee, "Solvent Extraction of Cesium and Rubidium with Triphenylcyano Boron," J. Inorg. Nucl. Chem. 34, 2895 (1972)).

Since ion-selective membranes must be virtually nonpermeable to anions, lipophilic anionic sites are employed which render the membrane hydrophobic, and simultaneously lower the loss of anionic reagent into the aqueous phase. Previous work has also shown that the use of nitrosolvents leads to higher selectivity of attraction in comparison with more basic solvents able to form competing hydrogen bonding solvent complexes (the basicity is related to the donor number of the solvent, which is about 4 for nitrobenzene and nitromethane, 18 for water, and yet higher for strongly basic solvents like tributylphosphate, dimethylsulfoxide, etc.). Thus, low basicity and donor capability are the principal reasons for using nitrosolvents in electrochemical sensors. Similarly, nitrophenyl octyl ether has been used in solvent extraction systems as a substitute for the more toxic nitrobenzene (P. Selucky, "Selectivities of Extraction of Alkali Metal Cations into o-Nitrophenyl Octyl Ether," 1st Workshop of EC Project No. CIPA-CT93-0133 (DG 12HSMU), Rez, Czech Republic, May 5, 1994).

Known processes for the removal of radioactive cesium and strontium are liquid extraction, sorption, and coprecipitation. Although the solvent extraction process is generally rapid, and the extractant can be recycled, thereby lowering the overall process cost, it suffers from the drawback that the specific extractants employed often depend on the composition of the feed material. Moreover, since a second liquid phase is present, the process cannot readily be stopped and the extractant disposed of. Thus, the handling of liquids in radiochemical separation processes on an industrial scale is more cumbersome and dangerous than handling well-defined solid phases.

Sorption methods often present problems with release of colloidal particles from the sorbent. For some sorbents, a substantially irreversible chemical reaction occurs (for example, with ferrocyanides of transition or heavy metals, mixed $Cs^+$ salts of the metal are formed), and reuse of the sorbent is not practicable. Even if sorbents possess high distribution coefficient values, $K_d$, for the sorption process and low values thereof for the desorption process, they may not have sufficient capacity to absorb macroamounts of cesium and strontium. Still other sorbents may absorb cations other than cesium and strontium irreversibly, thereby diminishing the value of the sorbent for these ions.

Similar disadvantages exist for coprecipitation processes (for example, coprecipitation of cesium with sodium tetraphenylborate). In fact, precipitation methods in radiochemical separations have generally been abandoned, principally as a result of the difficulty in handling precipitates by filtration and similar processes. Precipitation of uranium in the treatment of nuclear fuels, once used throughout the world, has been replaced by liquid extraction processes.

Accordingly, it is an object of the present invention to provide a method for removing cesium and strontium from aqueous solution using solid polymeric materials.

Another object of the present invention is to provide a method for removing cesium and strontium from aqueous solution using solid polymeric materials which may be reused after the extractants are desorbed therefrom.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for removing strontium and cesium from aqueous solution of the present invention includes the steps of: contacting the aqueous solution with a matrix which comprises a polymer, a plasticizer soluble in the polymer, and a hydrophobic anion soluble in the plasticizer which is capable of attracting Cs and Sr, thereby permitting cesium and strontium present to be extracted into the matrix by the hydrophobic anion; and separating the aqueous solution from the matrix.

Preferably, the method for removing cesium and strontium from aqueous solution further includes the step of removing the Cs and Sr from the matrix such that the matrix can be used again.

It is also preferred that in the method for removing cesium and strontium from aqueous solution, the steps of contacting the aqueous solution with the matrix, separating the matrix from the aqueous solution, and removing the Cs and Sr from the matrix, are repeated until a chosen concentration of Cs and Sr in the aqueous solution is obtained.

In another aspect of the present invention, and in conformance with its objects and purposes, the method for the preparation of polymeric materials suitable for removing cesium and strontium from aqueous solution hereof includes the steps of: forming a first solution of a polymer in a suitable volatile solvent; forming a second solution of a hydrophobic anion which attracts cesium and strontium in a plasticizer for the polymer; mixing the first solution with the second solution; and removing the volatile solvent; whereby a film is produced.

Benefits and advantages of the present invention include efficient separation of cesium and strontium from aqueous solution, either acidic or basic, using hydrophobic anions soluble in nontoxic, nonhazardous solvents which are trapped in the matrix and thereby reusable for many separations.

DETAILED DESCRIPTION

Briefly, the present invention includes the use of polymeric materials containing plasticizers which are solvents for hydrophobic anions, such as derivatives of cobalt dicarbollide or tetraphenylborate, which are capable of attracting cesium and strontium ions from aqueous solutions in contact with the polymeric materials. The polymeric material may also include a synergistic agent such as polyethylene glycol or a crown ether, for removal of radioactive isotopes of strontium from solutions of diverse composition and, in particular, for solutions containing molar concentrations of sodium nitrate. The separation agents bound in the polymeric matrix maintain properties similar to those possessed in solvent extraction processes. Hence, all usual methods for desorption, known from extraction research and technology as back extraction, are applicable. The capacity of the sorbent is dependent upon the concentration of the separation agent within the matrix and may be varied. There is no heterogeneous phase material release as may occur in liquid extraction processes. That is, no solid particles or solvent are lost from the matrix. The handling of saturated sorbent is straightforward; it may be disposed of, stored, or after desorption of the elements, reused.

Having generally described the invention, the following examples more particularly describe the synthesis of representative matrices for which the $K_d$ for the radionuclide in question is less than 100, in order to permit desorption of that element from the sorbent. This may be accomplished in the case of tetraphenylborate compounds by using diluted acid under conditions where tetraphenylboron does not precipitate in the membrane, and in the case of cobalt dicarbollide, by the methods used in liquid extraction technology. The distribution coefficient, $K_d$, in this application is defined according to common definition as:

$$K_d = (a_s/a_a) \cdot (V/g)$$

where $a_s$ and $a_a$ are the radioactivities of the element after sorption, in the solid and aqueous phases, respectively, g is the mass of the sorbent in grams, and V is the volume of the aqueous phase, typically milliliters, from which the Cs and Sr are being extracted.

EXAMPLE 1

Hexachloro-cobalt dicarbollide (H form), in the amount of 0.467 g, was dissolved in 3.33 mL of o-nitro phenyl octyl ether. To this solution, 0.1 mL of polyethylene glycol of average molecular weight 400 (PEG 400) was added. The former solution was mixed with a solution of 5% by weight of high molecular weight polyvinylchloride, PVC (Aldrich Chemical Company), in tetrahydrofuran (THF) to a total volume of 50 mL. After mixing, the resulting solution was poured onto two Petri dishes of internal diameter 9.7 cm (25 mL on each dish). Evaporation of the THF occurred within about 24 hours forming a transparent, orange-colored soft membrane. This membrane was cut into pieces of about 1×1 cm. This material was either used directly for the sorption, or, alternatively, the membranes were pretreated by standing for 72 hours in 2.5M $HNO_3$. The ratio of aqueous phase volume to the weight of the membrane (V/g ratio) was kept at about 10. Membranes were contacted for the times shown below with aqueous solutions that contained $^{137}Cs$ and $^{85}Sr$ tracers. Afterward, an aliquot of the solution was analyzed by GeLi gamma-ray counting to determine the uptake of Cs and Sr. The following values for $K_d$ were obtained:

| Solution | Contact time | | | | | |
|---|---|---|---|---|---|---|
| | 4 hrs. | | 24 hrs. | | 4 hrs. (pretreated) | |
| composition | $K_d(Cs)$ | $K_d(Sr)$ | $K_d(Cs)$ | $K_d(Sr)$ | $K_d(Cs)$ | $K_d(Sr)$ |
| Solution #1 1 M $HNO_{3+}$ 2 M $NaNO_3$ | 5.17 | 10.25 | 5.57 | 12.14 | 6.27 | 11.92 |
| Solution #2 1 M $HNO_{3+}$ 4 M $NaNO_3$ | 3.69 | 5.61 | 3.64 | 6.63 | 4.33 | 5.13 |

The above results may be compared with analogous cobalt dicarbollide solvent extraction experiments where the uptake of Cs and Sr is expressed as D ($D=a_o/a_a$, where $a_o$ and $a_a$ represent the radioactivity of the organic and aqueous phases, respectively) after 30 min. of shaking the solutions. The solvent extraction experiments were performed using hexachloro-cobalt dicarbollide dissolved in nitro phenyl octyl ether with PEG 400. After contact with the aqueous solutions described above, Cs uptake values of 6.70 and 2.83, respectively, and Sr values of 29.8 and 7.44, respectively, were measured.

EXAMPLE 2

Hexachloro-cobalt dicarbollide, in the amount of 0.7 g, was dissolved in 5 ml of 4-chloro-3- nitrotoluene and 0.15 ml of PEG 400. The solution was shaken 3 times with 2.5 M $HNO_3$, the organic phase separated from the aqueous phase and 70 ml (5% by weight) of PVC of low molecular weight (Aldrich Chemical Company) in THF were added. The solution was poured into three dishes of internal diameter of 9.7 cm (25 ml of solution to each dish) and the THF evaporated overnight. Analogous experiments to those described above were performed with the following results:

| Solution | Contact time | | | | | |
|---|---|---|---|---|---|---|
| | 4 hrs. | | 24 hrs. | | 4 hrs. (pretreated) | |
| composition | $K_d(Cs)$ | $K_d(Sr)$ | $K_d(Cs)$ | $K_d(Sr)$ | $K_d(Cs)$ | $K_d(Sr)$ |
| Solution #1 1 M $HNO_{3+}$ 2 M $NaNO_3$ | 3.53 | 15.0 | 3.46 | 17.5 | 6.31 | 21.7 |
| Solution #2 1 M $HNO_{3+}$ 4 M $NaNO_3$ | 2.51 | 7.91 | 2.18 | 10.3 | 4.31 | 9.24 |

These results may be compared with liquid extraction distribution ratios measured under similar conditions to those of the preceding example. Measured values for D(Cs) were 6.55 and 2.41 for the two solution compositions given in the above table, whereas those for D(Sr) were 28.4 and 11.7, respectively.

EXAMPLE 3

An amount of sodium tetraphenylborate equivalent to 0.2M solution was added to 3.33 ml of 4-chloro-3 nitrotoluene and 0.1 ml of PEG 400. After shaking this mixture twice with fresh portions of 6 ml of 1M $NaNO_3$, complete dissolution occurred. A 3 ml aliquot of the resulting solution was mixed with 47 ml of 5% by weight of high molecular weight PVC in THF. The mixture was poured into two Petri dishes of internal diameter of 9.7 cm (25 ml to each) and tetrahydrofuran was evaporated overnight. The membrane was cut as in Example 1, and shaken with the solutions of compositions given in the following table for 17 hours. The following values for $K_d$ for cesium and strontium were obtained:

| Solution composition (1M NaOH + →) | 1.90 M $NaNO_3$ | 3.04 M $NaNO_3$ | 3.94 M $NaNO_3$ |
|---|---|---|---|
| $K_d(Cs)$ | 234.1 | 201.2 | 92.1 |
| $K_d(Sr)$ | 62.5 | 22.5 | 12.3 |
| Solution composition | 1 M NaOH | 2.05 M NaOH | 3.15 M NaOH | 4.12 M NaOH |
| $K_d(Cs)$ | 373.2 | 21.2 | 141 | 467 |
| $K_d(Sr)$ | 27.7 | 29.7 | 8.47 | 4.12 |

These values may be compared with the distribution ratios defined and determined as in Example I for extraction with the same solvent but in the absence of polymer. For a mixture of 1M NaOH and 2M $NaNO_3$ the D(Cs) was higher than 200, whereas for a mixture 1M NaOH+4M $NaNO_3$, D(Cs)was 10.5.

EXAMPLE 4

A solution of 0.2M sodium tetraphenylborate in dibutyl phthalate with 3% by volume of PEG 400 was shaken for 30 min. with an identical volume of a solution consisting of 1M $HNO_3$ and 4M $NaNO_3$. Distribution ratios of 11.9 and 1.17 were observed for cesium and strontium, respectively. By analogy with Examples 1–3, it is reasonable to assume that similar, or slightly lower, values will be found for the polyvinyl chloride membrane prepared therein.

EXAMPLE 5

A solution of 0.2M chlorinated cobalt dicarbollide as its hydrogen salt was prepared in dibutyl phthalate, and 3% by volume of PEG 400 was added. The organic solution was shaken for 30 min. with an aqueous solution of 1M $HNO_3$ and 2M $NaNO_3$. Distribution ratios of 0.510 and 1.36 for cesium and strontium, respectively, were determined.

EXAMPLE 6

A solution was prepared as in Example 5, hereof, with the exception that instead of dibutyl phthalate, a mixture of 45% by volume of o-nitrophenyl octyl ether and 55% by volume of dodecyl benzene was utilized. The organic solution was shaken with an aqueous solution as set forth in Example 5, hereof. Distribution ratios of 6.70 and 29.8 were observed for cesium and strontium, respectively.

The foregoing description of the invention has been presented for purposes of illustration and description and is not intended to be exhaustive or to limit the invention to the precise form disclosed, and obviously many modifications and variations are possible in light of the above teaching. For example, it would be apparent to those having ordinary skill in the art of ion selective electrode technology and liquid extraction technology, after studying the subject disclosure, that materials containing other polymers, such as polycarbonate, polyvinyl acetate, polystyrene, polystyrene butadiene, polymethacrylate, polyimide, cellulose acetate, polyurethane, polydimethylsiloxane, polybisphenol, and polysulfone; plasticizers, such as nitrosolvent plasticizers (halogenated nitrobenzenes and nitrotoluenes; 4-chloro-3-nitrotoluene, 2,4-dichloronitrobenzene, and mixtures thereof, for example), dialkyl esters of dicarboxylic acids (for example, dibutyl phthalate, dioctyl sebacate), dodecylbenzene, and mixtures thereof, or a mixture of at least one of these plasticizers with a nonpolar solvent); and a hydrophobic anion such as cobalt dicarbollide, tetraphenylborate, or substituted derivatives thereof, would also behave as solid extractants. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for removing cesium and strontium from aqueous solution, which comprises the steps of:
   a. contacting the aqueous solution with a matrix which comprises a polymer, a plasticizer soluble in the polymer, and a hydrophobic anion soluble in the plasticizer which is capable of attracting Cs and Sr, thereby permitting the Cs and Sr present to be attracted into the matrix by the hydrophobic anion; and
   b. separating the aqueous solution from the matrix.

2. The method for removing cesium and strontium from aqueous solution as described in claim 1, wherein the polymer is selected from the group consisting of polyvinyl chloride, polycarbonate, polyvinyl acetate, polystyrene, polystyrene butadiene, polymethacrylate, polyimide, cellulose acetate, polyurethane, polydimethylsiloxane, polybisphenol, and polysulfone.

3. The method for removing cesium and strontium from aqueous solution as described in claim 1, wherein the hydrophobic anion is selected from the group consisting of cobalt dicarbollide, sodium tetraphenyl borate, and derivatives thereof.

4. The method for removing cesium and strontium from aqueous solution as described in claim 1, wherein the plasticizer is selected from the group consisting of o-phenyl octyl ether, halogenated nitrobenzenes and nitrotoluenes and dialkyl esters of dicarboxylic acids.

5. The method for removing cesium and strontium from aqueous solution as described in claim 4, wherein the halogenated nitrobenzenes and nitrotoluenes include 2,4-dichloronitrobenzene and 4-chloro-3-nitrotoluene.

6. The method for removing cesium and strontium from aqueous solution as described in claim 4, wherein the dialkyl esters of dicarboxylic acids include dibutyl phthalate, and dioctyl sebacate.

7. The method for removing cesium and strontium from aqueous solution as described in claim 1, wherein the matrix further comprises a synergistic material for strontium selected from the group consisting of polyethylene glycol, Slovafol 909, Triton 114, and crown ethers for improving the strontium uptake of the matrix.

8. The method for removing cesium and strontium from aqueous solution as described in claim 1, wherein the matrix is a thin film.

9. The method for removing cesium and strontium from aqueous solution as described in claim 1, further comprising the step of removing the cesium and strontium from the matrix such that the matrix can be used again.

10. The method for removing cesium and strontium and cesium from aqueous solution, as described in claim 9, wherein the steps of contacting the aqueous solution with the matrix, separating the matrix from the aqueous solution, and removing the Cs and Sr from the matrix, are repeated until a chosen concentration of Cs and Sr in the aqueous solution is obtained.

11. A method for the preparation of polymeric materials suitable for removing cesium and strontium from aqueous solution, which comprises the steps of:
   a. forming a first solution of a polymer in a volatile solvent therefor;
   b. forming a second solution of a hydrophylic anion which attracts cesium and strontium in a plasticizer for the polymer;
   c. mixing the first solution with the second solution; and
   d. removing the volatile solvent; whereby a film is produced.

12. The method for the preparation of polymeric materials suitable for removing cesium and strontium from aqueous solution as described in claim 11, wherein the polymer is selected from the group consisting of polyvinyl chloride, polycarbonate, polyvinyl acetate, polystyrene, polystyrene butadiene, polymethacrylate, polyimide, cellulose acetate, polyurethane, polydimethylsiloxane, polybisphenol, and polysulfone.

13. The method for the preparation of polymeric materials suitable for removing cesium and strontium from aqueous solution as described in claim 11, wherein the hydrophobic anion is selected from the group consisting of cobalt dicarbollide, sodium tetraphenyl borate, and derivatives thereof.

14. The method for the preparation of polymeric materials suitable for removing cesium and strontium from aqueous solution as described in claim 11, wherein the plasticizer is selected from the group consisting of o-phenyl octyl ether, halogenated nitrobenzenes and nitrotoluenes and dialkyl esters of dicarboxylic acids.

15. The method for the preparation of polymeric materials suitable for removing cesium and strontium from aqueous solution as described in claim 14, wherein the halogenated nitrobenzenes and nitrotoluenes include 2,4-dichloronitrobenzene and 4-chloro-3-nitrotoluene.

16. The method for the preparation of polymeric materials suitable for removing cesium and strontium from aqueous solution as described in claim 14, wherein the dialkyl esters of dicarboxylic acids include dibutyl phthalate, and dioctyl sebacate.

17. The method for the preparation of polymeric materials suitable for removing cesium and strontium from aqueous solution as described in claim 11, further comprising the step of adding a synergistic material selected from the group consisting of polyethylene glycol, Slovafol 909, Triton 114, and crown ethers for improving the strontium uptake of the matrix, to the first solution.

* * * * *